Figure 1:
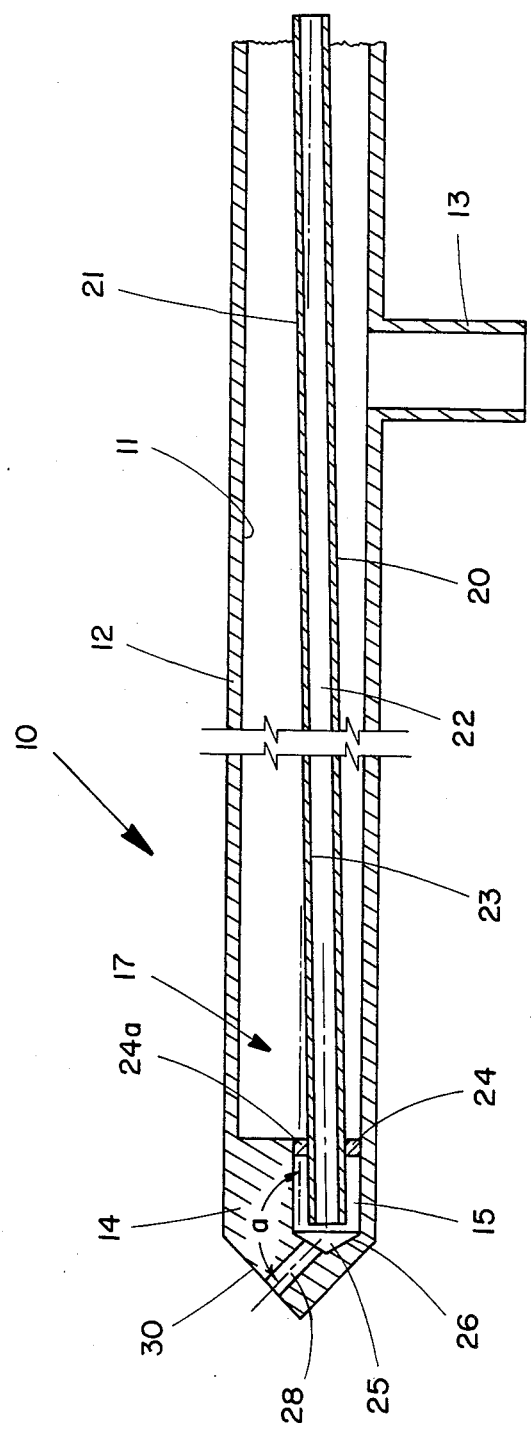

United States Patent [19]

Lipp

[11] Patent Number: 4,679,733

[45] Date of Patent: Jul. 14, 1987

[54] TWO-FLUID NOZZLE FOR ATOMIZING A LIQUID-SOLID SLURRY

[75] Inventor: Charles W. Lipp, Baton Rouge, La.

[73] Assignee: The Dow Chemical Company, Midland, Mich.

[21] Appl. No.: 839,254

[22] Filed: Mar. 13, 1986

[51] Int. Cl.⁴ .......................... B05B 7/00; B05B 7/14
[52] U.S. Cl. .................................. 239/432; 239/434.5
[58] Field of Search ............................ 239/432, 434.5

[56] References Cited

U.S. PATENT DOCUMENTS

| 1,154,974 | 9/1915 | Custer | 239/432 |
|---|---|---|---|
| 1,194,827 | 8/1916 | Edgerton . | |
| 1,277,320 | 8/1918 | Kinney et al. . | |
| 1,415,523 | 5/1922 | Cameron . | |
| 1,481,419 | 1/1924 | Davies . | |
| 1,981,704 | 11/1934 | Moore | 239/432 |
| 2,385,508 | 9/1945 | Hammond | 241/5 |
| 2,391,422 | 12/1945 | Jackson | 299/140 |
| 2,550,390 | 4/1951 | Stephanoff | 241/1 |
| 2,825,543 | 3/1958 | McCracken et al. | 261/118 |
| 2,899,287 | 8/1959 | Paris | 48/61 |
| 2,904,417 | 9/1959 | Te Nuyl | 48/212 |
| 2,945,074 | 7/1960 | Elliott et al. | 260/679 |
| 3,096,023 | 7/1963 | Thomas | 239/432 |
| 3,326,472 | 6/1967 | Gjerde | 239/427.5 |
| 3,607,156 | 9/1971 | Schlinger et al. | 48/206 |
| 3,705,108 | 12/1972 | Marion et al. | 252/373 |
| 3,715,301 | 2/1973 | Tassoney et al. | 208/8 |
| 3,847,564 | 11/1974 | Marion et al. | 48/95 |
| 3,864,100 | 2/1975 | Blaskowski | 48/73 |
| 4,140,477 | 2/1979 | Culbertson | 431/175 |
| 4,230,278 | 10/1980 | Reed | 239/427.5 |
| 4,338,099 | 7/1982 | Crouch et al. | 48/197 |
| 4,351,645 | 9/1982 | Marion et al. | 48/61 |
| 4,364,744 | 12/1982 | Crouch et al. | 48/86 R |
| 4,371,378 | 2/1983 | Brent et al. | 48/86 |
| 4,443,230 | 4/1984 | Stellaccio | 48/197 |
| 4,453,913 | 6/1984 | Gitman | 431/8 |

OTHER PUBLICATIONS

John H. Perry, Chemical Engineers' Handbook, 4th Edition, pp. 18–66.

Primary Examiner—Andres Kashnikow
Attorney, Agent, or Firm—D. R. Howard; E. E. Spielman

[57] ABSTRACT

This invention relates to a two-fluid nozzle for atomizing a liquid-solid slurry. The nozzle provides for the discharge of the atomized liquid-solid slurry which is oblique to the direction of flow of the liquid-solid slurry in the nozzle.

8 Claims, 1 Drawing Figure

TWO-FLUID NOZZLE FOR ATOMIZING A LIQUID-SOLID SLURRY

BACKGROUND OF THE INVENTION

This invention relates to a two-fluid nozzle for atomizing a liquid-solid slurry.

Synthesis gas produced by the partial oxidation of a carbonaceous material, e.g., coal, can have its heating valve upgraded by feeding the gas to a vertical flow reactor for further reaction with an atomized carbonaceous slurry. Vertical flow reactors can be either of the upflow or the downflow type. The most significant reactions to occur are between the fixed carbon provided by the carbonaceous slurry and the $CO_2$ and water vapor content of the synthesis gas. These reactions yield CO and hydrogen which add to the heating value of the synthesis gas. The reactions are endothermic and avail themselves of the heat contained in the synthesis gas feed which is at a temperature in the range of from about 1090° C. to about 1650° C. and typically 1370° C.

The synthesis gas is usually obtained as the direct outflow from an entrained flow gasifier and is fed to a vertical flow reactor. Most commonly, the carbonaceous slurry is comprised of water and particulate coal and generally contains about 50 weight percent water. The carbonaceous slurry is fed to the vertical flow reactor in an atomized state and is preferably directed into the synthesis gas so as to effect an uniform dispersion of the carbonaceous slurry and the synthesis gas.

It is therefore an object of this invention to provide a two-fluid nozzle for feeding an atomized liquid-solid slurry to a gas fed vertical flow reactor whereby the atomized slurry and the gas will form a highly uniform dispersion.

THE INVENTION

This invention relates to a two-fluid mixing nozzle for atomizing a liquid-solid slurry. The nozzle of this invention is particularly suitable for use in atomizing a water-coal slurry feed to a vertical flow reactor. Generally speaking, the coal is provided to the slurry in a finely ground state so that substantially all of it passes through an ASTM E 11-70C Sieve Designation Standard 140 mm (alternative number 14 AN) and at least 80% passes through a ASTM E 11-70C Sieve Designation Standard 425 mm (alternative number 40). The atomizing gas fed to the nozzle is preferably steam, however, other gases such a nitrogen, synthesis gas etc. may be utilized.

The subject two-fluid mixing nozzle comprises an elongated first conduit for the flow of a gas through the nozzle. The gas is introduced into the distal (upstream) end or portion of the first conduit and is discharged from its proximate (downstream) end. Also provided is an elongated second conduit which has at least a portion of its length located within the first conduit. The second conduit provides for the flow of a liquid-solid slurry through the nozzle, which flow is cocurrent with the gas flow in the first conduit. The liquid-solid slurry is introduced into the distal (upstream) portion or end of and discharged from the proximate (downstream) end of the second conduit. The gas discharged from the proximate end of the first conduit and the liquid-solid slurry discharged from the proximate end of the second conduit are discharged into a dispersion chamber. In fluid communication with the dispersion chamber is a third conduit through which the dispersion formed in the dispersion chamber is discharged from the nozzle. Importantly, the third conduit is in oblique relationship with the longitudinal axis of the first conduit.

For economy in manufacture and ease in construction, the second conduit is preferably provided by the inside wall of an elongated central tube and the first conduit is provided by the inside wall of an outer tube and the outside wall of the central tube. As mentioned previously, at least a portion of the second conduit is within the first conduit and thus, the central tube will have an outside diameter smaller than the inside diameter of the outer tube for at least that portion of the central tube which is within the outer tube.

The second conduit can be coaxially located within the first conduit or angularly offset from the longitudinal axis of the first conduit. The selection of a concentric or angularly offset location for the second conduit is made based upon the nozzle tip design and upon the needed longitudinal length of the third conduit as hereinafter discussed.

As mentioned previously, the gas feed to the vertical flow reactor is introduced at the end of the reactor and flows along a path which is essentially parallel to the longitudinal axis of the reactor. The gas feed to the end of the reactor makes it expedient to introduce the atomized liquid-solid slurry from a nozzle which is located on the side wall of the reactor. To achieve best reaction results, the gas and the atomized liquid-solid slurry must be highly dispersed within one another. It has been found that a high degree of dispersion and good reaction results can be achieved if the atomized liquid-solid slurry is introduced to the reactor in a direction which intersects the gas at an upwardly directed angle, if the gas is introduced at the bottom of the reactor, or a downwardly directed angle, if the gas is introduced at the top of the reactor. The two-fluid nozzle of this invention provides for the angled discharge of the atomized liquid-solid slurry by way of the third conduit's oblique relationship with the longitudinal axis of the first conduit. By having the third conduit so oriented, the two-fluid nozzle of this invention can be mounted to the reactor sidewall in a conventional manner, i.e., the nozzle longitudinal axis is transverse the reactor longitudinal axis. Preferred oblique relationships are those in which the longitudinal axis of the third conduit forms an angle within the range of from about 100° to about 170° with the longitudinal axis of the first conduit. A more highly preferred angle range is the one of from about 130° to about 140°.

In a preferred form, the two-fluid nozzle of this invention provides that the first conduit have a reduced portion which has a cross-sectional area for flow less than the cross-sectional area for flow of that portion of the first conduit which is just upstream of this reduced portion. Since the first conduit is for gas flow, the smaller cross-sectional area for flow provided by this reduced portion will cause an increase in velocity of the gas passing therethrough. This reduced portion terminates at the dispersion chamber into which also is flowing the liquid-solid slurry from the second conduit. The high velocity gas intersects the liquid-solid slurry stream and produces a dispersion with same and also effects some atomization of the slurry. The thus formed atomized liquid-solid slurry and gas dispersion then passes through the third conduit as previously mentioned. It is preferred that the third conduit have a cross-sectional area for flow less than the combined cross-sectional areas for flow of the reduced portion and the second conduit at their respective discharge ends. By being thus dimensioned, further atomization in the third conduit of the liquid-solid slurry will occur to achieve the high degree of atomization ultimately sought.

These and other features of this invention contribution to satisfaction in use and economy in manufacture will be more fully understood from the following description and drawings and in which identical numerals refer to identical parts and in which:

FIG. 1 is a cross-sectional view of an embodiment of this invention.

Referring now to FIG. 1, there can be seen a two-fluid nozzle of this invention, generally designated by the numeral 10. Nozzle 10 includes an outer tube 12 having an inside wall 11. Nozzle 10 has a nozzle tip 14 which has cut therein bore 15. Located within the confines of inside wall 11 and bore 15 is central tube 20. For the embodiment shown in the drawing, a liquid-solid slurry passes through nozzle 10 by way of conduit 22 which is defined by the inside wall 23 of central tube 20 while gas will pass through nozzle 10 by way of the annular-like gas conduit, generally designated by the numeral 17. Gas conduit 17 is defined by the inside wall 11 of outer tube 12 and the inner wall of bore 15 and the outside wall 21 of central tube 20. Gas is fed to gas conduit 17 by way of feed conduit 13.

Central tube 20 is located substantially coaxial with the longitudinal axis of bore 15 and is maintained in that relationship by means of three spacers of which two are shown in FIG. 1 and indicated by the numerals 24 and 24a. The spacers are located at approximately 120° apart. It is to be understood that additional spacers may be utilized if the need should arise. Adjacent the discharge end of tube 20 and bore 15 is dispersion chamber 25. Dispersion chamber 25 is defined by a conical wall 26. In gas communication with dispersion chamber 25 is conduit 28. For the embodiment shown in the drawing, the longitudinal axis of conduit 28 is at an angle, "a", of about 135° with the longitudinal axis of outer tube 12. Nozzle tip 14 has a nozzle face 30 which is conical in shape. Due to the conical shape of nozzle face 30 and the desired length of conduit 28, tube 20 is most conveniently offset at an angle from the longitudinal axis of outer conduit 12.

As can be seen in the drawing, bore 15, which forms the reduced portion of conduit 17, has a cross-sectional area for flow substantially less than that for the portion of gas conduit 17 just adjacent bore 15. This difference in cross-sectional areas for flow provides a higher velocity for the gas and a resultant significant velocity disparity between the water-coal slurry flow and the gas flow when they meet within dispersion chamber 25. This disparity in velocity results in good dispersion of the two streams with respect to one another and some atomization. The dispersion then passes through conduit 28 which has a cross-sectional area for flow less than the combined cross-sectional areas for flow of conduit 22 and bore 15. This disparity in cross-sectional area for flow results in further atomization of the dispersion.

Sizing of the various conduits and the selection of the angle "a" are dependent upon the gaseous reactant feed rate to the reactor, the liquid-solid slurry composition and feed rate, the atomizing gas pressure and feed rate and the degree of atomization sought. The sizing and angle determinations are best made empirically due to the many interacting factors involved. It has been found, for example, that when: the gas reactant is synthesis gas flowing to the reactor at the rate of 380 actual cubic feet/hour (15,576 cc/sec); the liquid-solid slurry feed is a water-coal slurry feed which contains 50 weight percent water and is fed at the rate of 42 gallons/hour (0.0441 liters/sec); and the atomizing gas is nitrogen and is fed to nozzle 10 at the rate of 100 pounds/hour (0.126 kg/sec), that nozzle 10 can be dimensioned as follows:

Outside tube 12: 1½ inch (3.81 cm) diameter 310 SS SCH. 40

Central tube 20: ⅛ inch (0.3175 cm) diameter 310 SS SCH. 40

Bore 15: ¾ inch (1.91 cm) diameter, 1-11/16 inch (4.286 cm) long

Conduit 28: 7/32 inch (0.56 cm) diameter, and angled 135° with respect to the longitudinal axis of outside tube 12 and a length of 1.1 inch (2.79 cm)

While certain representative embodiments and details have been shown for the purpose of illustrating the present invention, it will be apparent to those skilled in the art that various changes and modifications can be made without departing from the spirit and scope of the invention.

I claim:

1. A two-fluid mixing nozzle which comprises:
   (a) an elongated first conduit for the flow of a gas through said nozzle, said gas being introduced into the distal end or portion of said first conduit and discharged from the proximate end of said first conduit into a dispersion chamber, said first conduit including a reduced portion, said reduced portion (1) having a cross-sectional area for flow which is less than the cross-sectional area for flow provided by that portion of said first conduit which is adjacent said reduced portion, (2) having a longitudinal axis which is angularly offset from the longitudinal axis of at least a portion of the remainder of said first conduit, and (3) terminating at its downstream end at said dispersion chamber;
   (b) an elongated second conduit which has a portion thereof located within and substantially coaxial with the longitudinal axis of said reduced portion of said first conduit, said second conduit being for the flow, cocurrently with the flow of said gas, of a liquid-solid slurry through said nozzle, said liquid-solid slurry being introduced into the distal end or portion of said second conduit and being discharged from the proximate end of said second conduit, said liquid-solid slurry discharge being into said dispersion chamber; and
   (c) a third conduit in fluid communication with said dispersion chamber through which the dispersion formed in said dispersion chamber is discharged from said nozzle, said third conduit being in oblique relationship with the longitudinal axis of said at least a portion of the remainder of said first conduit.

2. The nozzle of claim 1 wherein the longitudinal axis of said third conduit forms an angle within the range of from about 100° to about 170° with the longitudinal axis of said at least a portion of the remainder of said first conduit.

3. The nozzle of claim 1 wherein the longitudinal axis of said third conduit forms an angle within the range of from about 130° to about 140° with the longitudinal axis of said at least a portion of the remainder of said first conduit.

4. The nozzle of claim 1 wherein said third conduit has a cross-sectional area for flow less than the combined cross-sectional areas for flow of said reduced portion of said first conduit and said second conduit at their respective discharge ends.

5. The nozzle of claim 1 wherein said dispersion chamber is conical in shape and said third conduit intersects said dispersion chamber at a point adjacent said dispersion chamber's apex.

6. The nozzle of claim 5 wherein said third conduit has a cross-sectional area for flow less than the combined cross-sectional areas for flow of said reduced portion of said first conduit and said second conduit at their respective discharge ends.

7. The nozzle of claim 6 wherein the longitudinal axis of said third conduit forms an angle within the range of from about 100° to about 170° with the longitudinal axis of said at least a portion of the remainder of said first conduit.

8. The nozzle of claim 7 wherein the longitudinal axis of said third conduit forms an angle within the range of from about 130° to about 140° with the longitudinal axis of said at least a portion of the remainder of said first conduit.

* * * * *